US009417713B2

(12) United States Patent
Huang et al.

(10) Patent No.: US 9,417,713 B2
(45) Date of Patent: Aug. 16, 2016

(54) IMAGE-CAPTURING DEVICE FOR OPTICAL POINTING APPARATUS HAVING LARGE AND SMALL AREA IMAGE-SENSING UNITS

(75) Inventors: Sen Huang Huang, Hsinchu (TW); Hsin Chia Chen, Hsinchu (TW); Tzung Min Su, Hsinchu (TW); Han Chi Liu, Hsinchu (TW); Ho Ching Chien, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 333 days.

(21) Appl. No.: 13/368,637

(22) Filed: Feb. 8, 2012

(65) Prior Publication Data

US 2012/0206352 A1 Aug. 16, 2012

(30) Foreign Application Priority Data

Feb. 16, 2011 (TW) ............................ 100105043 A

(51) Int. Cl.
*G06F 3/03* (2006.01)
*G06F 3/042* (2006.01)

(52) U.S. Cl.
CPC .................................... *G06F 3/0317* (2013.01)

(58) Field of Classification Search
CPC ............................ G06F 3/0317; G06F 3/0321
USPC ........... 345/156–159, 163–166; 382/103, 107
See application file for complete search history.

(56) References Cited

U.S. PATENT DOCUMENTS 7,256,387 B2 * 8/2007 Kwak ...................... G01D 5/26 250/221
7,679,605 B2 * 3/2010 Cheah .................. G06F 3/0317 345/163
2007/0247428 A1 * 10/2007 Hock .................. G06F 3/0383 345/166
2008/0007526 A1 * 1/2008 Xu et al. ...................... 345/163
2008/0252602 A1 * 10/2008 Kakarala ............... G06F 3/0317 345/166
2009/0195503 A1 * 8/2009 Lee ...................... G06F 3/0317 345/166

* cited by examiner

*Primary Examiner* — Temesgh Ghebretinsae
*Assistant Examiner* — Lisa Landis
(74) *Attorney, Agent, or Firm* — Juan Carlos A. Marquez; Marquez IP Law Office

(57) ABSTRACT

An image-capturing device configured for an optical pointing apparatus includes a plurality of image-sensing units arranged adjacently. The plurality of image-sensing units are configured to sense images of a surface and generate sensing signals that are used for evaluating the velocity of the optical pointing apparatus. The image-capturing device is configured to use different image-sensing units arranged differently to sense the surface according to the velocity of the optical pointing apparatus. When the optical pointing apparatus moves at a first velocity, the image-capturing device uses the image-sensing units configured to occupy a smaller area to sense the surface. When the optical pointing apparatus moves at a second velocity, the image-capturing device uses the image-sensing units configured to occupy a larger area to sense the surface. The first velocity is lower than the second velocity.

22 Claims, 6 Drawing Sheets

IMAGE-CAPTURING DEVICE FOR OPTICAL POINTING APPARATUS HAVING LARGE AND SMALL AREA IMAGE-SENSING UNITS

CROSS-REFERENCE TO RELATED APPLICATION

The present application is based on, and claims priority from, Taiwan Patent Application Serial Number 100105043, filed on Feb. 16, 2011, the disclosure of which is hereby incorporated by reference herein in its entirety.

BACKGROUND

1. Technical Field

The present invention relates to an optical pointing apparatus, and relates more particularly to an optical pointing apparatus comprising an image-capturing device.

2. Related Art

Pointing apparatuses such as an electronic mouse are devices that can detect their displacements relative to their supporting surfaces. A user grasps a pointing apparatus and slides the pointing apparatus on a planar surface. The pointing apparatus may compute its displacement relative to the planar surface, and may use the displacement as an input signal sent to a computer. A conventional pointing apparatus may compute its displacement according to the number of rolling cycles counted by the roller on the apparatus as the device rolls on a surface. However, accumulated dust may adversely affect the accuracy of the calculation of the displacement of the roller pointing apparatus after the roller pointing apparatus has been used for a long time. Due to such disadvantage, with the development of technology, optical pointing apparatuses such as the optical mouse increasingly replace such roller pointing apparatuses.

Optical pointing apparatuses similarly detect their displacements relative to their supporting surfaces. Unlike conventional roller pointing apparatuses, optical pointing apparatuses detect their displacements based on reflective light. FIG. 1 shows a conventional optical pointing apparatus. As shown in FIG. 1, the optical pointing apparatus 100 comprises a light source 102, a focus lens 104, a light extraction lens 106, a sensing device 108, and a processing unit 110. The light source 102 may be an LED (light-emitting diode) based light source or a laser, which projects light through the focus lens 104 onto a planar surface 150. The planar surface 150 reflects the light, and the light extraction lens 106 collects reflective light and brings it to the sensing device 108. The processing unit 110 uses output signals from the sensing device 108 to calculate the displacement of the optical pointing apparatus 100 relative to the planar surface 150.

FIG. 2 shows an enlarged sensing device 108. As illustrated in FIG. 2, the sensing device 108 comprises a plurality of image-sensing elements 200 arranged in an array. The image-sensing elements 200 may capture the image of the planar surface 150 whereby the output signals are generated. The processing unit 110 compares the correlation between two successive images, and determines the displacement of the optical pointing apparatus 100 relative to the planar surface 150 by the relative orientation and distance between two highly correlated regions. For example, if the comparison result from the processing unit 110 shows that the second image is highly correlated with the upper left region of the first image, it can be determined that the optical pointing apparatus 100 is moving in the lower right direction.

Generally, under the condition that the number of image-sensing elements 200 is the same, if the areas of the image-sensing elements 200 are larger, the resolution of the image-sensing elements 200 is lower; while if the areas of the image-sensing elements 200 are smaller, the detectable displacement range is smaller. In other words, regardless whether the areas of the image-sensing elements 200 are large or small, the performance of the optical pointing apparatus 100 has its own limitation. The optical pointing apparatus with large area image-sensing units has poor resolution that causes users to experience non-smooth cursor movements. In contrast, with optical pointing apparatus with small area image-sensing units, the user needs to move the optical pointing apparatus farther to obtain sufficient accuracy of desired input signals, and the optical pointing apparatus with small area image-sensing units leads to a smaller detectable displacement range.

Therefore, the relevant industry needs a new optical pointing apparatus.

SUMMARY

Embodiments provide an image-capturing device that is configured for an optical apparatus and has the advantages of both optical pointing apparatus with large and small area image-sensing units so as to meet different usage requirements.

In one embodiment, an image-capturing device configured for an optical pointing apparatus comprises a plurality of adjacently arranged image-sensing units. The plurality of adjacently arranged image-sensing units are configured to sense an image of a surface and generate a sensing signal that is adapted to evaluate a velocity of the optical pointing apparatus. The image-capturing device uses different arrangements of the image-sensing units to sense the image of the surface according to different velocities of the optical pointing apparatus. When the optical pointing apparatus moves at a first velocity, the image-capturing device uses image-sensing units configured to occupy a smaller area to sense the surface; and when the optical pointing apparatus moves at a second velocity, the image-capturing device uses image-sensing units configured to occupy a larger area to sense the surface, wherein the first velocity is lower than the second velocity.

In another embodiment, an image-capturing device configured for an optical pointing apparatus comprises a plurality of adjacently arranged image-sensing units. The plurality of adjacently arranged image-sensing units are configured to sense an image of a surface and generate a sensing signal that is adapted to evaluate a velocity of the optical pointing apparatus. The image-capturing device uses different arrangements of the image-sensing units to sense the image of the surface according to different velocities of the optical pointing apparatus. When the optical pointing apparatus moves at a first velocity, the image-capturing device is configured to use a plurality of image-sensing units with high count-per-inch (CPI) resolution to sense the surface; and when the optical pointing apparatus moves at a second velocity, the image-capturing device uses a plurality of image-sensing units with low count-per-inch resolution to sense the surface, wherein the first velocity is lower than the second velocity.

To better understand the above-described objectives, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF DISCLOSED EMBODIMENTS

Figure 1:
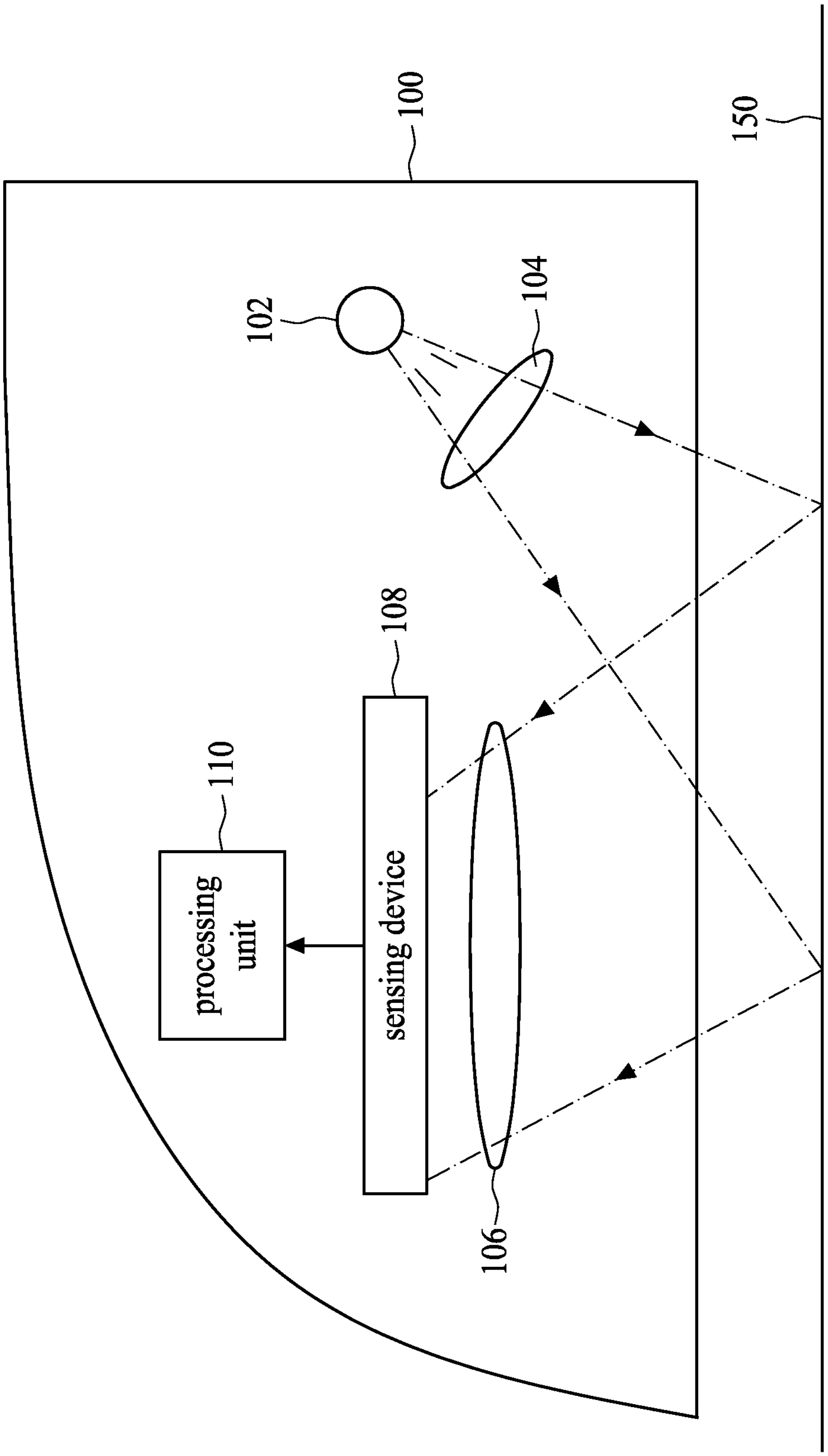
FIG. 1 shows a conventional optical pointing apparatus.
Figure 2:
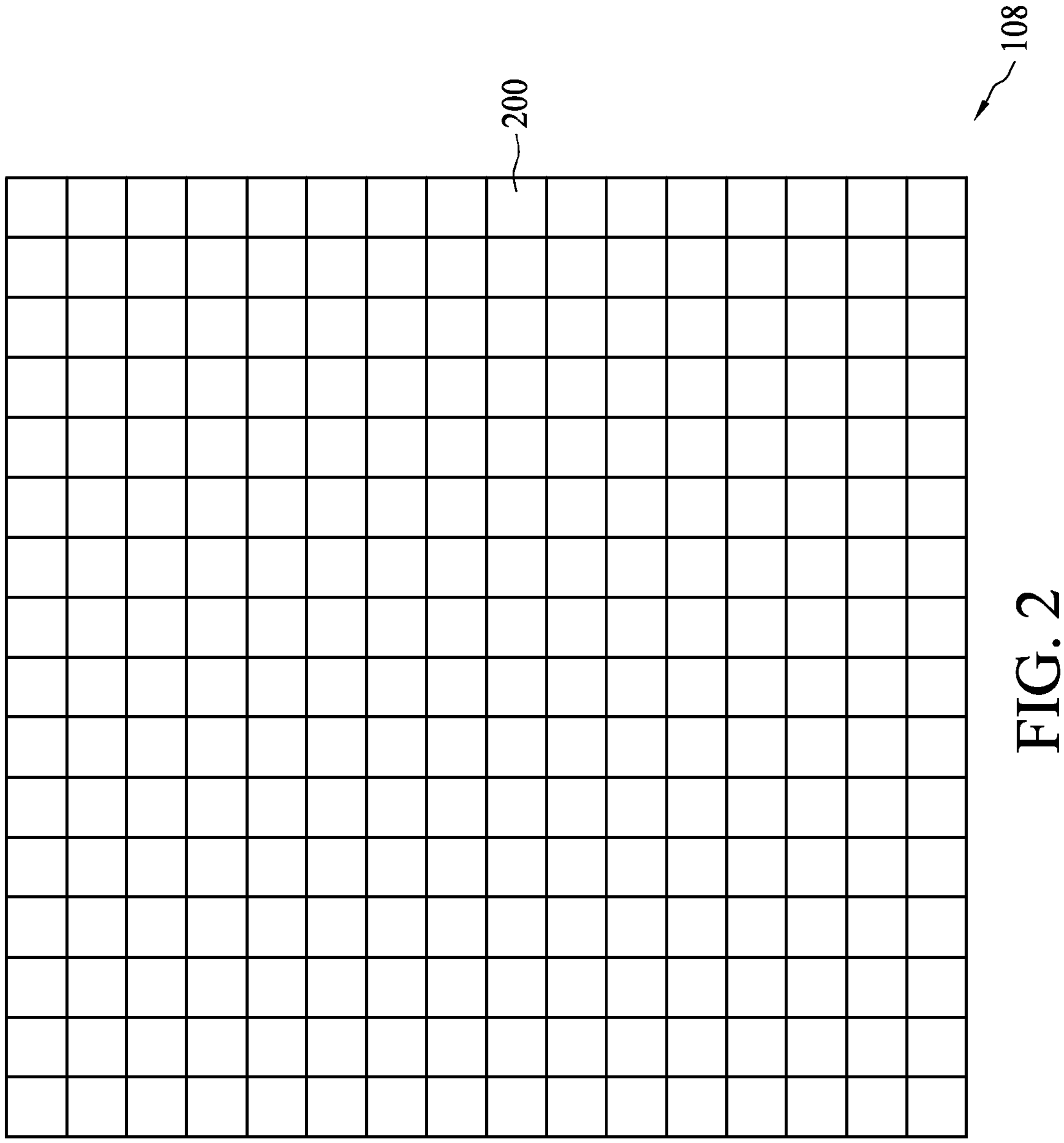
FIG. 2 shows an enlarged sensing device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 3:
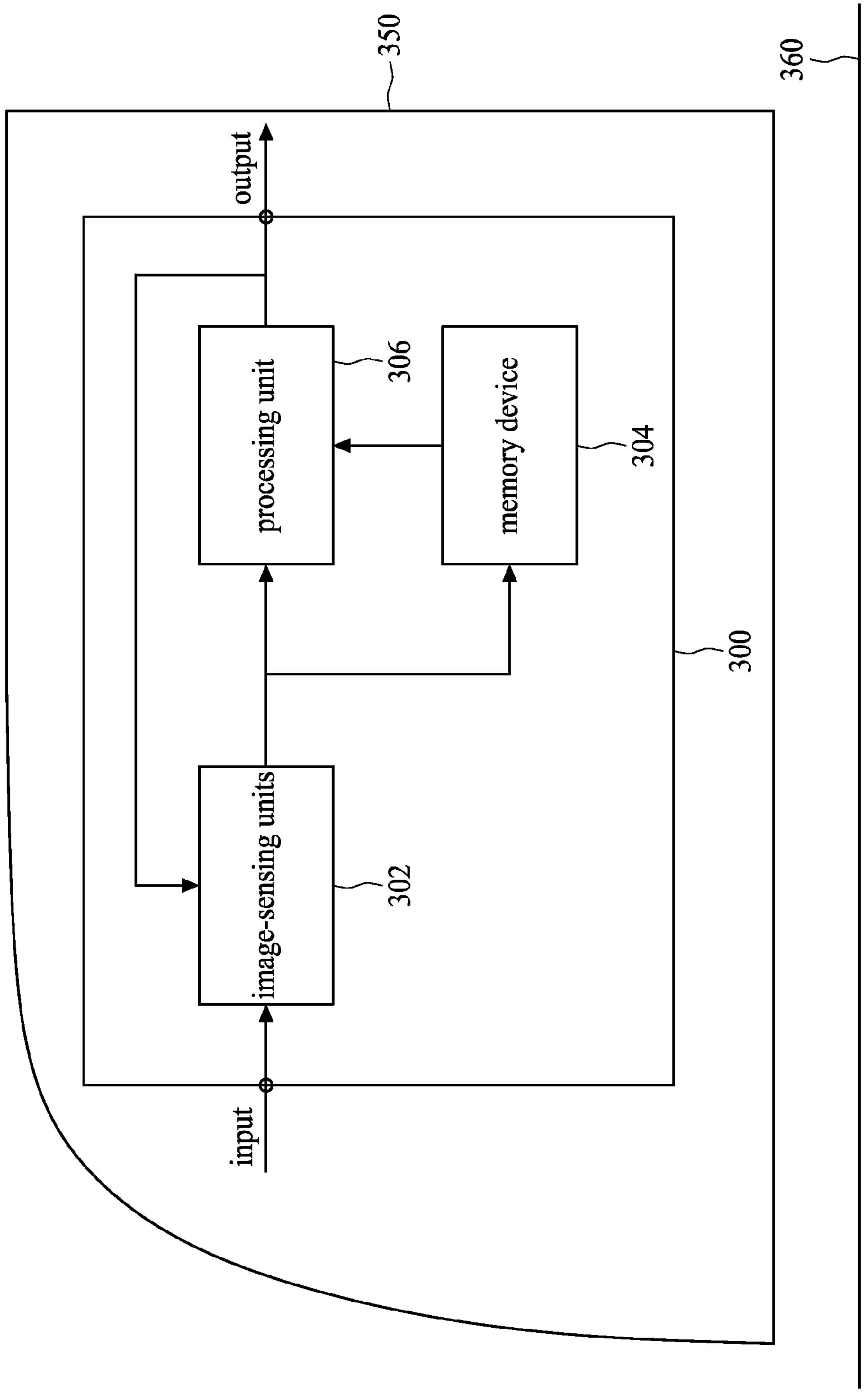
FIG. 3 is a view showing an image-capturing device configured for an optical pointing apparatus according to one embodiment of the present invention.

FIG. 3 is a view showing an image-capturing device configured for an optical pointing apparatus according to one embodiment of the present invention. Referring to FIG. 3, the image-capturing device 300 can be installed in an optical pointing apparatus 350 and comprises a plurality of image-sensing units 302 arranged adjacently, a memory device 304, and a processing unit 306. The optical pointing apparatus 350 can slide relative to a planar surface 360. The image-sensing units 302 are configured to sense images of a surface and to generate sensing signals that can be used to evaluate the velocity of the optical pointing apparatus 350. The memory device 304 is configured to store the sensing signals generated by the image-sensing units 30. The processing unit 306 is configured to compare the sensing signals stored in the memory device 304 with the sensing signals generated by the image-sensing units 302 to compute the distance of the movement of the optical pointing apparatus 350.

Figure 4:
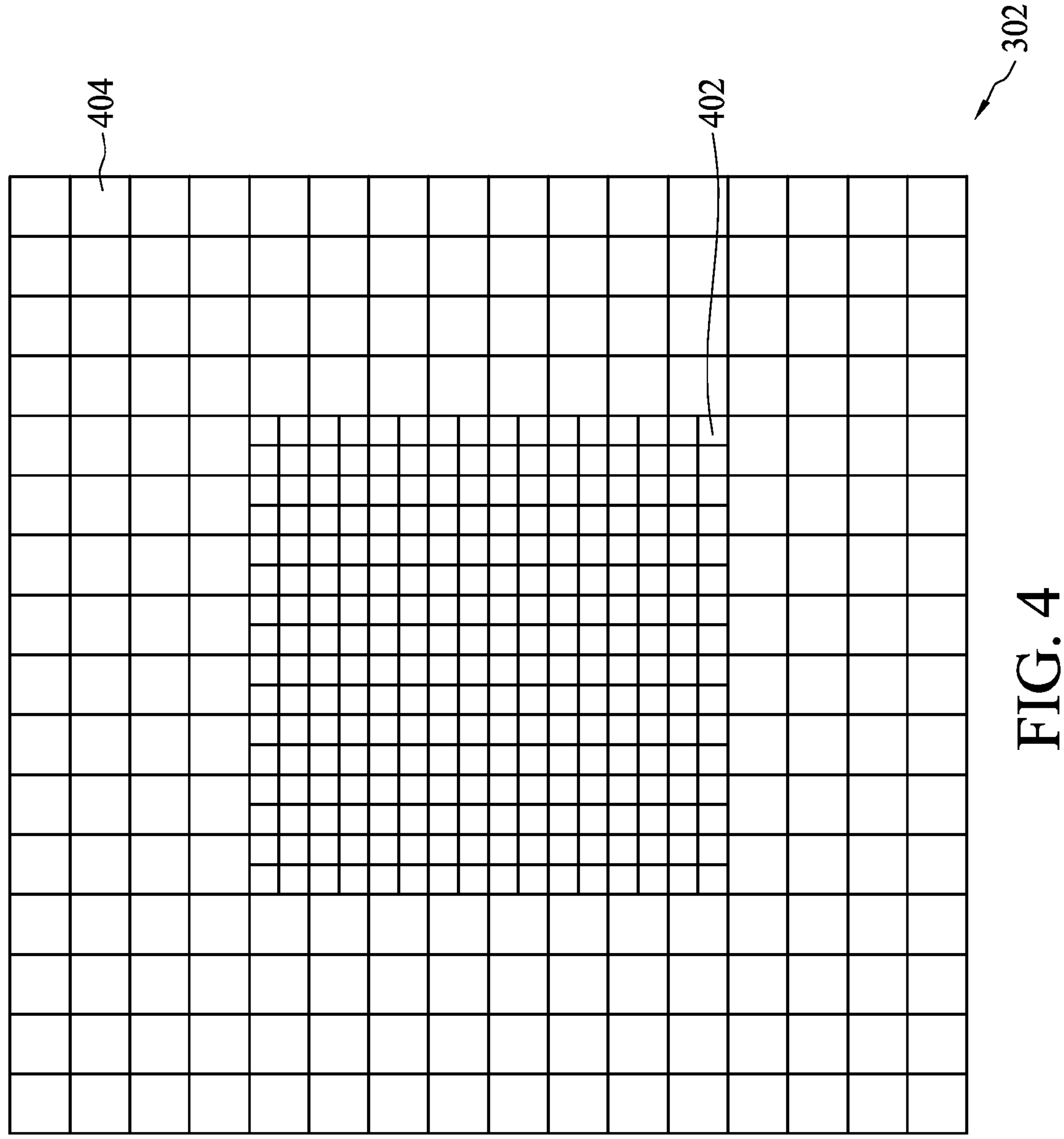
FIG. 4 is an enlarged view showing image-sensing units according to one embodiment of the present invention.

FIG. 4 is an enlarged view showing image-sensing units 302 according to one embodiment of the present invention. As shown in FIG. 4, the central region of the image-sensing units 302 comprises 256 image-sensing units 402 with small areas. The circumambient region of the image-sensing units 302 comprises 192 image-sensing units 404 with large areas, wherein the area of each image-sensing unit 404 is equal to 4 times the area of the image-sensing unit 402.

Referring to FIG. 3 again, the image-capturing device 300 may use different image-sensing units 302 to capture the image of the planar surface 360 by different velocities of the optical pointing apparatus 350. For example, when the optical pointing apparatus 350 moves at a first velocity, the image-capturing device 300 may be configured to use the small-area image-sensing units 402 to capture the image of the planar surface 360; whereas when the optical pointing apparatus 350 moves at a second velocity, the image-capturing device 300 may be configured to use the large-area image-sensing units 404 to capture the image of the planar surface 360, wherein the first velocity is lower than the second velocity. The small-area image-sensing units 402 constitute a sensing field of small dimension, and the image-capturing device 300 is configured to use the sensing field of small dimension to sense the surface 360 when the optical pointing apparatus 350 moves at a low velocity. Similarly, the image-capturing device 300 is configured to use the sensing field of large dimension to sense the surface 360 when the optical pointing apparatus 350 moves fast. When a user moves the optical pointing apparatus 350 slowly, the user most likely expects more precise computer input signals, and the high resolution provided by the sensing field of small dimension constituted by the small-area image-sensing units 402 can meet such expectation. When a user moves the optical pointing apparatus 350 fast, the sensing field of large dimension constituted by the large-area image-sensing units 404 can provide the capability to rapidly track the motion trajectory of the optical pointing apparatus 350. Therefore, the image-capturing device 300 may provide different sensing solutions according to different application conditions.

In another embodiment of the present invention, the image-sensing units 302 comprise high spatial resolution and low spatial resolution image-sensing units. When a user moves the optical pointing apparatus 350 at a slow velocity, the image-capturing device 300 employs the high count-per-inch (CPI) image-sensing units 302 to capture the image of the surface 360. When a user moves the optical pointing apparatus 350 at a high velocity, the image-capturing device 300 employs the low CPI image-sensing units 302 to capture the image of the surface 360.

Figure 5:
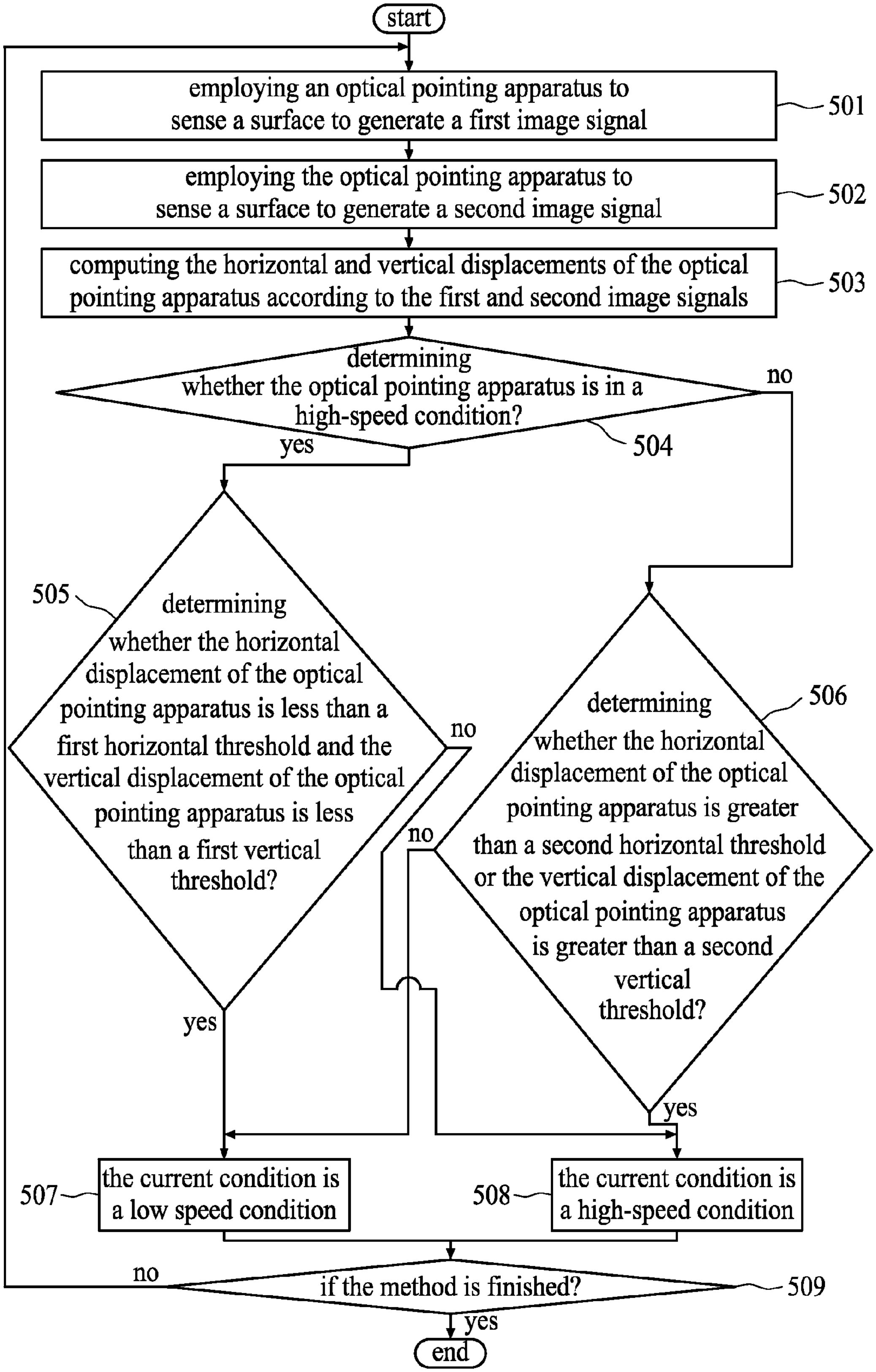
FIG. 5 is a flow diagram showing the steps of a method of calculating the displacement of an optical pointing apparatus according to one embodiment of the present invention.

FIG. 5 is a flow diagram showing the steps of a method of calculating the displacement of an optical pointing apparatus according to one embodiment of the present invention, wherein the calculating method can be applied to the processing unit 306. In Step 501, an optical pointing apparatus is employed to sense a surface to generate a first image signal, and the method then proceeds to Step 502. In Step 502, the optical pointing apparatus is employed to sense a surface to generate a second image signal, and the method proceeds to Step 503. In Step 503, the displacements of the optical pointing apparatus along the vertical and horizontal directions are computed according to the first and second image signals, and the method proceeds to Step 504. In Step 504, it is determined whether the optical pointing apparatus is in a high-velocity condition. If yes, the method proceeds to Step 505; otherwise the method proceeds to Step 506. In Step 505, the horizontal displacement and the vertical displacement of the optical pointing apparatus are compared with thresholds. If the horizontal displacement of the optical pointing apparatus is less than a first horizontal threshold and the vertical displacement of the optical pointing apparatus is less than a first vertical threshold, the method proceeds to Step 507; otherwise, the method proceeds to Step 508. In Step 506, the horizontal displacement and the vertical displacement of the optical pointing apparatus are compared with thresholds. If the horizontal displacement of the optical pointing apparatus is greater than a second horizontal threshold or the vertical displacement of the optical pointing apparatus is greater than a second vertical threshold, the method proceeds to Step 508; otherwise, the method proceeds to Step 507. In Step 507, the current condition is determined as a low velocity condition, a sensing field of small dimension is employed as the operative sensing field of the optical pointing apparatus, and the method proceeds to Step 509. In Step 508, the current condition is determined as a high-velocity condition, a sensing field of large dimension is employed as the operative sensing field of the optical pointing apparatus, and the method proceeds to Step 509. In Step 509, it is determined whether the method is finished. If yes, the method is terminated; otherwise, the method returns to Step 501.

Figure 6:
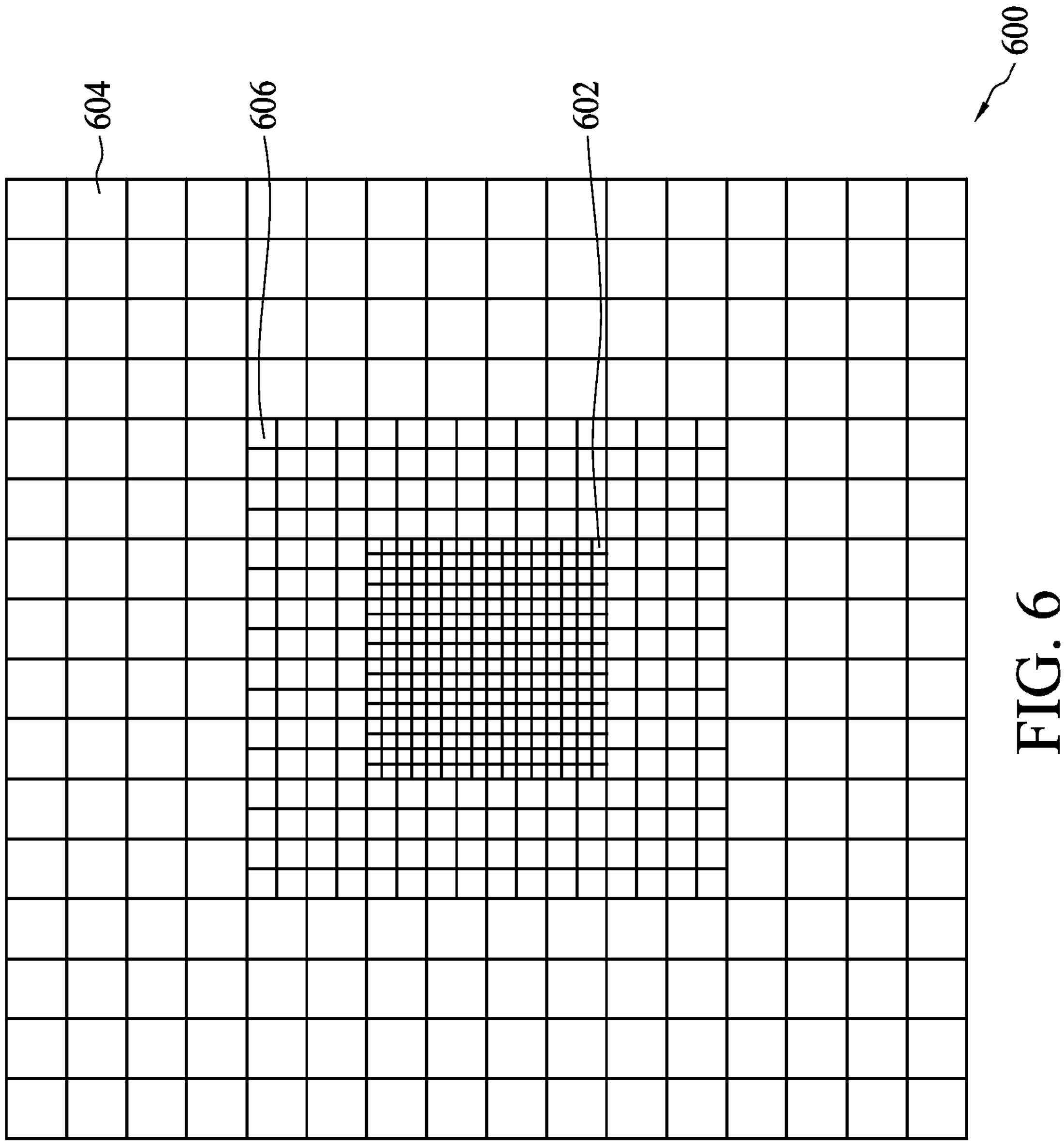
FIG. 6 is an enlarged view showing image-sensing units of an image-capturing device according to another embodiment of the present invention.

FIG. 6 is an enlarged view showing image-sensing units 600 of an image-capturing device according to another embodiment of the present invention. As shown in FIG. 6, the central region of the image-sensing units 600 comprises 256 small area image-sensing units 602. The circumambient region of the image-sensing units 600 comprises 192 large area image-sensing units 604. The middle region between the small area image-sensing units 602 and the large area image-sensing units 604 comprises 192 medium area image-sensing units 606. With this arrangement, the image-sensing units 600 can, in response to the velocity of the image-capturing device, employ the image-sensing units 602, 604 and 606 with different dimensions to provide high resolution or low resolution sensing fields.

The image-sensing units of the image-capturing device of the present invention are not limited to the arrangement in which the small area image-sensing units are in the central region and the large area image-sensing units are in the circumambient region. In some embodiments of the present invention, the dimensions of the image-sensing units in the central region are larger than those of the image-sensing units in the circumambient region, and in other embodiments of the present invention, the image-sensing units can all be equal in size. The image-capturing device of the present invention is not limited to an image-capturing device in which each output pixel corresponds to the output pixel information from an image-sensing unit. When the image-capturing device of the present invention is configured to use large-area or low CPI sensing field to sense a surface, each pixel of sensing signal generated by the image-sensing units can be formed by combining pixel information captured from a plurality of adjacent image-sensing units, wherein the combination of the pixel information from the plurality of adjacent image-sensing units can rely on binning techniques. In another embodiment of the present invention, when the image-capturing device of the present invention is configured to use a large-area or low CPI sensing field to sense a surface, each pixel is generated according to the pixel information from one of a plurality of adjacent image-sensing units.

In summary, an image-capturing device configured for an optical pointing apparatus can use different arrangements of image-sensing units to capture an image of a surface according to the velocity of the optical pointing apparatus. Therefore, the image-capturing device can track the movement of the optical pointing apparatus with sufficient CPI and without increasing image-sensing unit areas.

It will be apparent to those skilled in the art that various modifications and variations can be made to the disclosed embodiments. It is intended that the specification and examples be considered as exemplary only, with a true scope of the disclosure being indicated by the following claims and their equivalent.

What is claimed is:

1. An image-capturing device configured for an optical pointing apparatus, comprising:

a plurality of adjacently arranged image-sensing units configured to sense an image of a surface and generate a sensing signal being adapted to evaluate a velocity of the optical pointing apparatus, the plurality of adjacently arranged image-sensing units including at least a first plurality of image-sensing units and a second plurality of image-sensing units, wherein each of the image-sensing units of the first plurality occupy a physical area smaller than a physical area of each of the image-sensing units of the second plurality, and the first plurality being positioned an adjacently separate region from the second plurality;

wherein the image-capturing device configures different arrangements of the image-sensing units to sense the image of the surface according to different velocities of the optical pointing apparatus;

wherein when the optical pointing apparatus moves at a first velocity, the image-capturing device uses the first plurality of image-sensing units to sense the surface, and when the optical pointing apparatus moves at a second velocity, the image-capturing device uses the second plurality of image-sensing units to sense the surface, wherein the first velocity is lower than the second velocity, and wherein within the plurality of adjacently arranged image-sensing units, the first plurality of image-sensing units are positioned in a middle region and the second plurality of image-sensing units are positioned in a circumambient region.

2. The image-capturing device of claim 1, wherein when the optical pointing apparatus moves at the first velocity, the image-capturing device is configured to use a field of first dimension to sense the surface, and when the optical pointing apparatus moves at the second velocity, the image-capturing device is configured to use a field of second dimension to sense the surface, wherein the field of first dimension is smaller than the field of second dimension.

3. The image-capturing device of claim 2, further comprising:

a memory device configured to store sensing signals generated by the image-sensing units; and a processing unit configured to compare sensing signals stored in the memory device with sensing signals generated by the image-sensing units to compute a distance of movement of the optical pointing apparatus and to select the field of first dimension or the field of second dimension according to the distance.

4. The image-capturing device of claim 3, wherein the processing unit is configured to determine the velocity of the optical pointing apparatus by a computed horizontal or vertical displacement.

5. The image-capturing device of claim 4, wherein when the horizontal displacement computed by the processing unit is less than a first horizontal threshold and the vertical displacement computed by the processing unit is less than a first vertical threshold, the processing unit determines that the optical pointing apparatus moves at the first velocity, and when the horizontal displacement is greater than a second horizontal threshold or the vertical displacement is greater than a second vertical threshold, the processing unit determines that the optical pointing apparatus moves at the second velocity.

6. The image-capturing device of claim 1, wherein the image-sensing units configured to sense the surface by all of the image-sensing units when the optical pointing apparatus moves at the second velocity.

7. The image-capturing device of claim 1, wherein the image-sensing units configured to occupy a smaller physical area correspond to a portion of image-sensing units arranged adjacent to each other when the optical pointing apparatus moves at the first velocity.

8. The image-capturing device of claim 1, wherein when the image-sensing units are configured to occupy a larger physical area to sense the surface, a pixel of sensing signal generated by the image-capturing device is generated by a combination of pixel information from a plurality of adjacent image-sensing units.

9. The image-capturing device of claim 1, wherein when the image-sensing units are configured to occupy a larger physical area to sense the surface, a pixel of sensing signal generated by the image-capturing device is generated by pixel information from one of a plurality of adjacent image-sensing units.

10. The image-capturing device of claim 8, wherein a binning technique is employed to obtain the combination of pixel information from the plurality of adjacent image-sensing units.

11. The image-capturing device of claim 1, wherein the image-sensing units have a same dimension.

12. An image-capturing device configured for an optical pointing apparatus, comprising:

a plurality of adjacently arranged image-sensing units configured to sense an image of a surface and generate a sensing signal being adapted to evaluate a velocity of the optical pointing apparatus, the plurality of adjacently arranged image-sensing units including at least a first plurality of image-sensing units and a second plurality of image-sensing units, wherein the image-sensing units of the first plurality have count-per-inch resolution higher than a count-per-inch resolution of the image-sensing units of the second plurality, and the first plurality being positioned an adjacently separate region from the second plurality;

wherein the image-capturing device configures different arrangements of the image-sensing units to sense the image of the surface according to velocities of the optical pointing apparatus;

wherein when the optical pointing apparatus moves at a first velocity, the image-capturing device is configured to use the first plurality of image-sensing units to sense the surface, and when the optical pointing apparatus moves at a second velocity, the image-capturing device uses the second plurality of image-sensing units to sense the surface, wherein the first velocity is lower than the second velocity, and wherein within the plurality of adjacently arranged image-sensing units, the first plurality of image-sensing units are positioned in a middle region and the second plurality of image-sensing units are positioned in a circumambient region.

13. The image-capturing device of claim 12, wherein when the optical pointing apparatus moves at the first velocity, the image-capturing device is configured to use a field of first dimension to sense the surface, and when the optical pointing apparatus moves at the second velocity, the image-capturing device is configured to use a field of second dimension to sense the surface, wherein the field of first dimension is smaller than the field of second dimension.

14. The image-capturing device of claim 13, further comprising:

a memory device configured to store sensing signals generated by the image-sensing units; and a processing unit configured to compare sensing signals stored in the memory device with sensing signals generated by the image-sensing units to compute a distance of movement of the optical pointing apparatus and to select the field of first dimension or the field of second dimension according to the distance.

15. The image-capturing device of claim 14, wherein the processing unit is configured to determine the velocity of the optical pointing apparatus by a computed horizontal or vertical displacement.

16. The image-capturing device of claim 15, wherein when the horizontal displacement computed by the processing unit is less than a first horizontal threshold and the vertical displacement computed by the processing unit is less than a first vertical threshold, the processing unit determines that the optical pointing apparatus moves at the first velocity, and when the horizontal displacement is greater than a second horizontal threshold or the vertical displacement is greater than a second vertical threshold, the processing unit determines that the optical pointing apparatus moves at the second velocity.

17. The image-capturing device of claim 12, wherein the image-sensing units with high count-per-inch resolution correspond to all of the image-sensing units.

18. The image-capturing device of claim 12, wherein the image-sensing units with low count-per-inch resolution correspond to a portion of image-sensing units arranged adjacent to each other.

19. The image-capturing device of claim 12, wherein when the image-sensing units with high count-per-inch resolution are used to sense the surface, a pixel of sensing signal generated by the image-capturing device is generated by a combination of pixel information from a plurality of adjacent image-sensing units.

20. The image-capturing device of claim 12, wherein when the image-sensing units with high count-per-inch resolution are used to sense the surface, a pixel of sensing signal generated by the image-capturing device is generated by pixel information from one of a plurality of adjacent image-sensing units.

21. The image-capturing device of claim 19, wherein the combination of pixel information from the plurality of adjacent image-sensing units is a combination of analog or digital signals of pixel information captured from the plurality of adjacent image-sensing units.

22. The image-capturing device of claim 12, wherein the image-sensing units have a same dimension.

* * * * *